(12) United States Patent
Matsui (10) Patent No.: US 8,422,097 B2
(45) Date of Patent: Apr. 16, 2013

(54) APPARATUS AND METHOD FOR IMAGE PROCESSING AND PROCESSING PROGRAM (75) Inventor: Kiyoto Matsui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/571,208

(22) Filed: Aug. 9, 2012

(65) Prior Publication Data
US 2012/0300267 A1 Nov. 29, 2012

Related U.S. Application Data (63) Continuation of application No. 12/432,435, filed on Apr. 29, 2009, now Pat. No. 8,264,751.

(30) Foreign Application Priority Data

Apr. 30, 2008 (JP) .................................. 2008-118821

(51) Int. Cl.
*H04N 1/04* (2006.01)
*H04N 1/387* (2006.01)
*H04N 1/40* (2006.01)

(52) U.S. Cl.
USPC ........... 358/488; 358/453; 358/452; 358/449; 358/464; 358/465; 358/497

(58) Field of Classification Search .......... 358/449–453, 358/464, 465, 488, 474, 497, 448; 382/282, 382/286, 291, 294, 312, 318, 319
See application file for complete search history.

(56) References Cited

U.S. PATENT DOCUMENTS

| | | | |
|---|---|---|---|
| 7,321,687 B2 * | 1/2008 | Yamamoto | 382/170 |
| 8,102,575 B2 * | 1/2012 | Hattori | 358/449 |
| 2007/0013974 A1 * | 1/2007 | Hattori | 358/486 |
| 2010/0103474 A1 * | 4/2010 | Oiwa et al. | 358/461 |
| 2010/0165417 A1 * | 7/2010 | Hayakawa | 358/453 |
| 2010/0284043 A1 * | 11/2010 | Hattori | 358/448 |
| 2010/0315689 A1 * | 12/2010 | Hayakawa et al. | 358/474 |
| 2011/0002015 A1 * | 1/2011 | Hayakawa et al. | 358/448 |
| 2012/0013953 A1 * | 1/2012 | Suzuki | 358/448 |

* cited by examiner

*Primary Examiner* — Cheukfan Lee
(74) *Attorney, Agent, or Firm* — Canon USA Inc. IP Division (57) ABSTRACT

Disclosed is an image processing method for processing an image obtained by reading a document plate on which at least one document is placed. The method includes a first detecting step of specifying a first rectangular region including all of objects included in the image to detect the coordinates of each vertex thereof, an identifying step of identifying on each object whether it is a document item, an eliminating step of eliminating the object which is not a document item from the image, a second detecting step of specifying a second rectangular region to detect the coordinates of each vertex thereof, the region including all of the objects after elimination and having a minimum area, a comparing step of comparing the coordinates of the vertices detected in the first and second detecting steps, and a determining step of determining a method of cropping the document based on the comparison result.

11 Claims, 9 Drawing Sheets

APPARATUS AND METHOD FOR IMAGE PROCESSING AND PROCESSING PROGRAM

This application is a continuation of application Ser. No. 12/432,435, filed on Apr. 29, 2009, which claims the benefit of Japanese Patent Application No. 2008-118821 filed Apr. 30, 2008, which are hereby incorporated by reference herein in their entirety.

BACKGROUND OF THE INVENTION

1. Field of the Invention

The present invention relates to an image processing apparatus and method for reading a document placed on an image reader, processing the read image, and outputting the processed image, and a processing program.

2. Description of the Related Art

There has been known a technique of reading a document placed on an image reader, extracting an object from the read image, and automatically determining a document region based on the position of the document and the size thereof. When it is previously known that only one document is placed, a document region is determined on the basis of all of extracted objects (first process). When the number of documents is not limited to one, a document region is determined on the basis of each extracted object (second process). A user can also be allowed to select either of the above-described first and second processes in accordance with the number of documents.

However, if the user cannot determine which process is appropriate for a document set by the user because he or she has little experience, it is difficult for the user to select either of the first and second processes. Unfortunately, the user has to select an appropriate process.

SUMMARY OF THE INVENTION

The present invention provides an image processing method for processing an image obtained by reading a document plate on which at least one document is placed. The method includes a first detecting step of specifying a first rectangular region including all of objects included in the image to detect the coordinates of each vertex of the first rectangular region, an identifying step of identifying on each of the objects whether the object corresponds to a document item serving as or included in the document placed on the document plate, an eliminating step of eliminating the object, identified as a non-object that does not correspond to a document item in the identifying step, from the image, a second detecting step of specifying a second rectangular region to detect the coordinates of each vertex of the second rectangular region, the second rectangular region including all of the objects in the image subjected to the eliminating step, each side of the second rectangular region being parallel to the corresponding side of the image, the second rectangular region having a minimum area, a comparing step of comparing the coordinates of each vertex detected in the first detecting step with the coordinates of the vertices detected in the second detecting step, and a determining step of determining a method of cropping the document in accordance with the result of the comparing step.

Further features of the present invention will become apparent from the following description of exemplary embodiments with reference to the attached drawings.

DESCRIPTION OF THE EMBODIMENTS

First Embodiment

Figure 1:
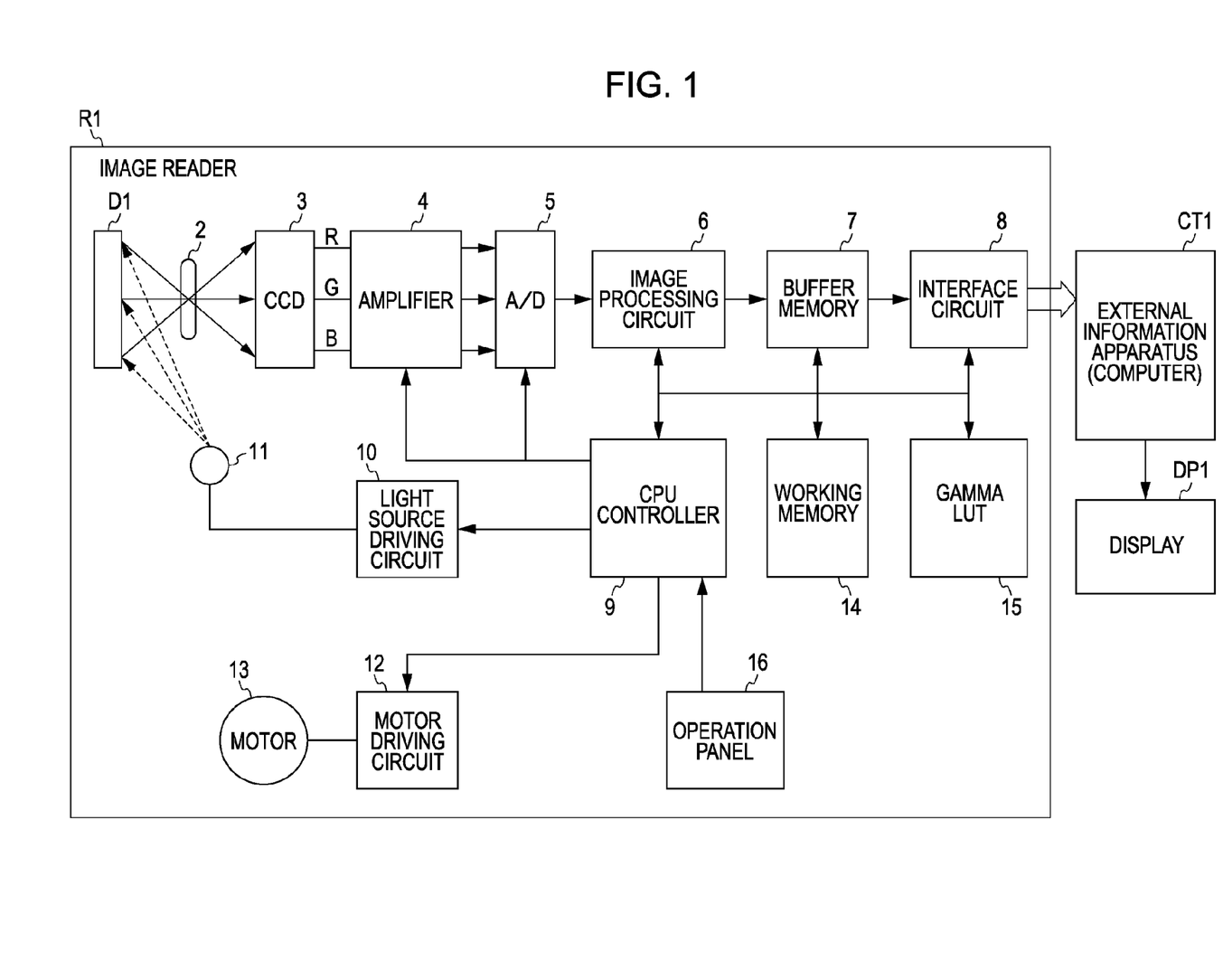
FIG. 1 is a block diagram of an image reader R1 according to an embodiment of the present invention.

FIG. 1 is a block diagram of an image reader R1 according to a first embodiment of the present invention. The image reader R1 includes an imaging lens 2, a charge-coupled device linear image sensor (CCD) 3, an amplifier 4, an analog-to-digital (A/D) converter 5, an image processing circuit 6, a buffer memory 7, an interface circuit 8, and a CPU controller 9. The image reader R1 further includes a light source driving circuit 10, a light source lamp 11, a motor driving circuit 12, a driving motor 13, a working memory 14, a gamma lookup table (LUT) 15, and an operation panel 16. The CCD 3 is a solid state image pickup device. The amplifier 4 amplifies an analog image signal output from the CCD 3. The A/D converter 5 converts the analog image signal output from the amplifier 4 into a digital image signal. The image processing circuit 6 performs image processing, such as offset correction, shading correction, digital gain adjustment, color balance adjustment, color masking conversion, and resolution conversion in the main and sub scanning directions.

The buffer memory 7 includes a RAM and temporarily stores image data. The interface circuit 8, through which a command is transferred or image communication is performed, is connected to an external information apparatus CT1. As for the interface circuit 8, for example, an SCSI, a parallel interface, a USB interface, an IEEE 1394 interface, a LAN interface, or a wireless LAN interface is used. The CPU controller 9 controls the image reader R1 in accordance with an instruction from the external information apparatus CT1. Specifically, the CPU controller 9 controls the image processing circuit 6, the light source driving circuit 10, and the motor driving circuit 12. The light source driving circuit 10 turns on or off the light source lamp 11. The light source lamp 11 illuminates a document D1. Reflected light having an intensity according to a density on the surface of the document D1 passes through the imaging lens 2, so that an image based on the light is formed on the linear image sensor serving as the CCD 3. The motor driving circuit 12 drives the driving motor 13, such as a stepper motor, and outputs an excitation signal for the driving motor 13 in accordance with a control signal supplied from the CPU controller 9 serving as a system control unit of the image reader R1. The working memory 14 is used as a temporal working memory for image processing by the image processing circuit 6. The working memory 14 is used to correct the RGB interline offset between image signals from R, G, and B linear sensors arranged in parallel to one another with a predetermined offset on the CCD 3. The working memory 14 also temporarily stores various pieces of data for shading correction.

The gamma LUT 15 is used for gamma correction. The CPU controller 9 detects a state of the operation panel 16 and transmits data indicative of the detected state through the interface circuit 8 to the external information apparatus CT1. The external information apparatus CT1 is a host computer, such as a personal computer, and is connected to a monitor display DP1.

Figure 2:
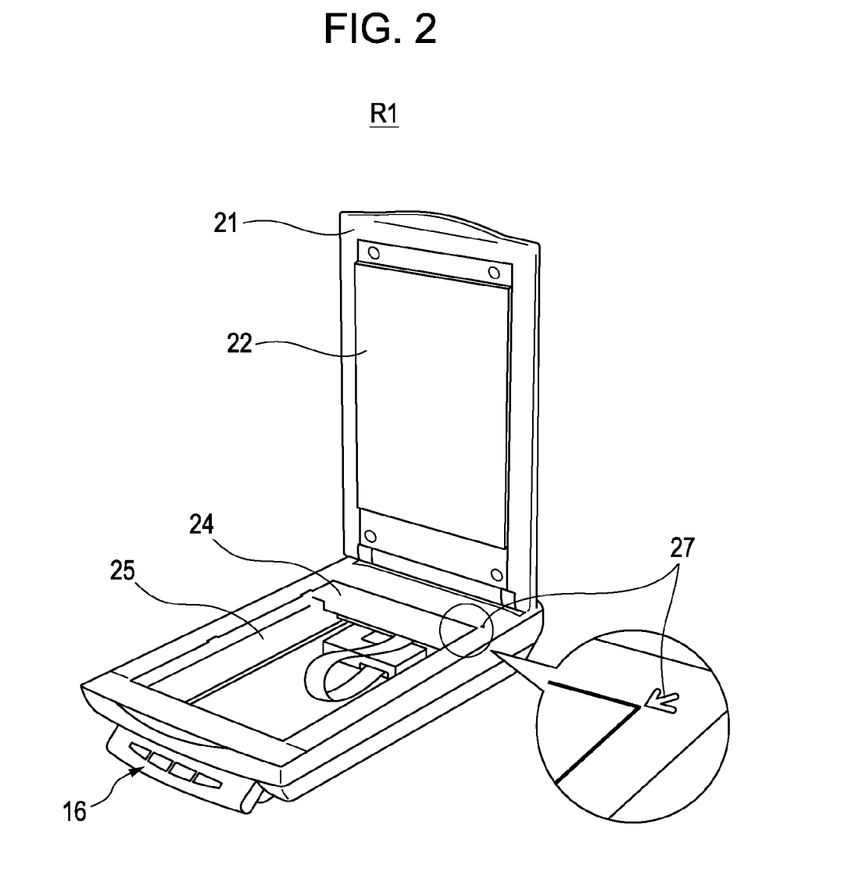
FIG. 2 is a diagram illustrating the appearance of the image reader R1.

FIG. 2 is a diagram illustrating the appearance of the image reader R1. The image reader R1 includes a document pressing plate 21, a white sheet 22, a reading optical unit 24, a document plate 25, the operation panel 16, and a mark 27 indicative of a document reference position. The document pressing plate 21 stably presses a document on the document plate 25. The white sheet 22 allows a thin document sheet to be in tight contact with the document plate 25 and allows image data corresponding to a space surrounding the document D1 to express white. The document plate 25 holds a document. A user enters a simple instruction, e.g., a reading start instruction using the operation panel 16. The mark 27 indicating the document reference position represents the start position for reading the document D1 placed on the document plate 25.

An operation of reading a document image by the image reader R1 will be described below in brief. The CPU controller 9 in the image reader R1 initializes the circuits in FIG. 1 in response to a reading instruction supplied from the external information apparatus CT1. The driving motor 13 is driven to move the reading optical unit 24 in the sub scanning direction through a gear unit and a driving belt, which are not shown. Synchronously with the movement, the CCD 3 acquires luminance information of the surface of the document, which is illuminated by the light source lamp 11 and is located above the reading optical unit 24, and the A/D converter 5 converts the information into image signals serving as digital electrical signals. The image processing circuit 6 performs resolution conversion and density conversion on the digital image signals and sequentially outputs the resultant signals to the external information apparatus CT1 through the interface circuit 8. Image data related to the read document on the document plate 25 is stored in the external information apparatus CT1. The external information apparatus CT1 performs image processing, which will be described below, on the image data.

Figure 3:
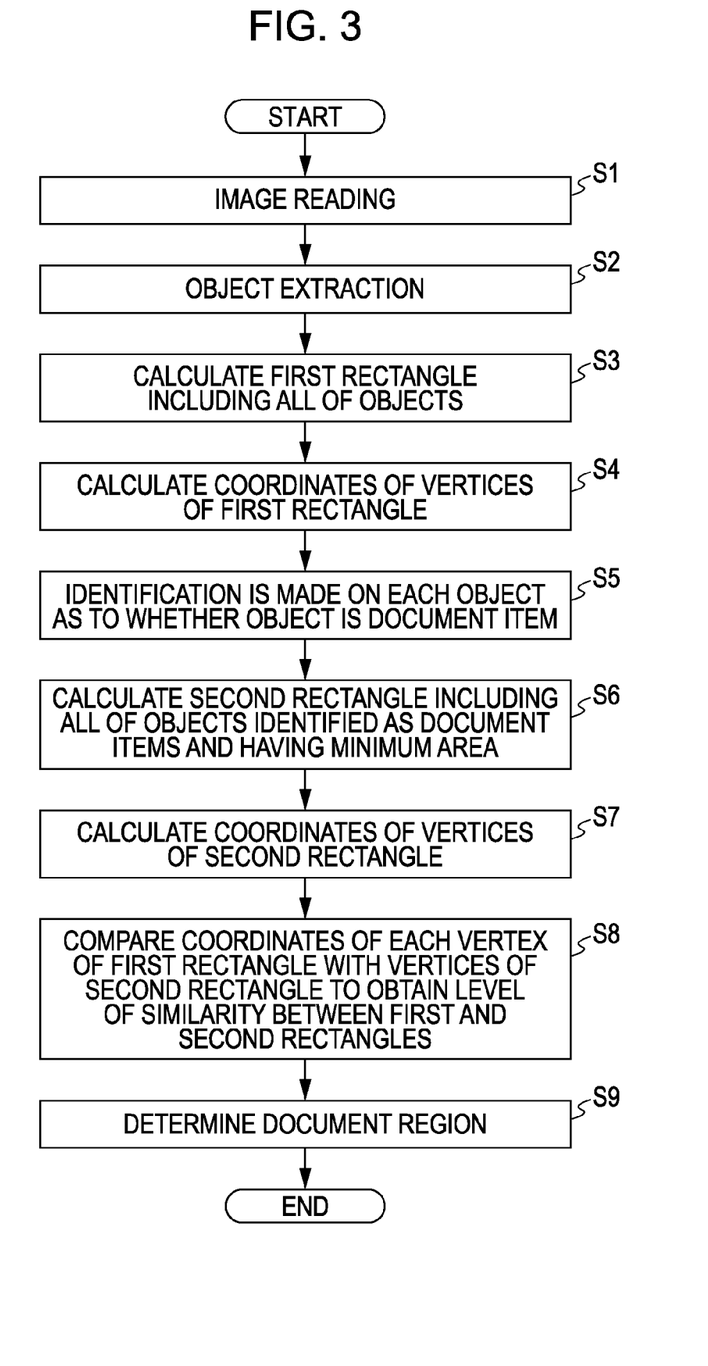
FIG. 3 is a flowchart of an operation for obtaining a document region from an image read by the image reader R1.
Figure 4A:
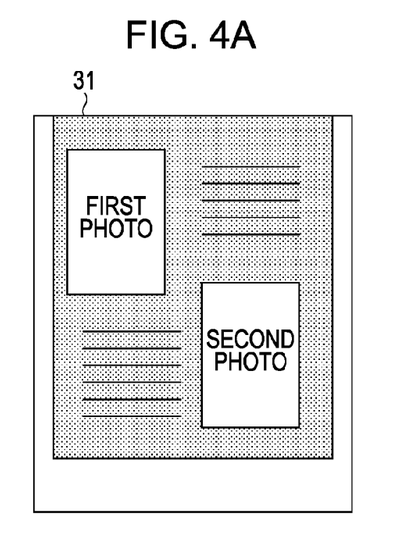
FIGS. 4A and 4B are diagrams illustrating two kinds of read images 31 and 32, respectively.
Figure 4B:
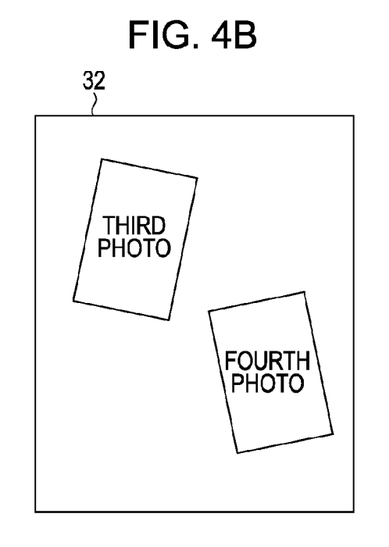

FIG. 3 is a flowchart of an operation of obtaining a document region from an image read by the image reader R1. In step S1, the image reader R1 reads an image. At that time, a reading resolution may be low for prescanning or may be high for scanning. FIGS. 4A and 4B are diagrams illustrating two kinds of read images 31 and 32. The image 31 is obtained by reading one magazine document including photos and text. The image 32 is obtained by reading a plurality of photo documents placed on the document plate 25.

Figure 4C:
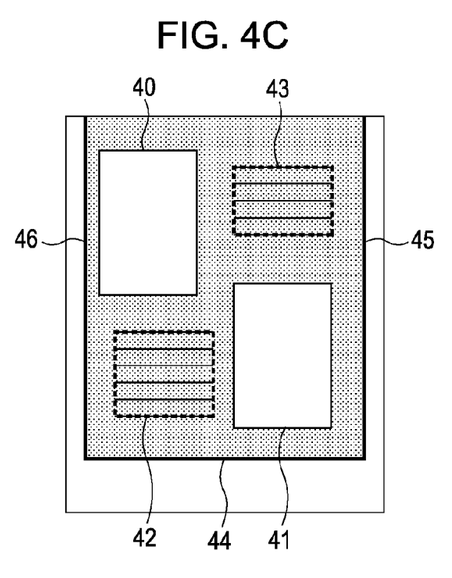
FIGS. 4C and 4D are diagrams illustrating objects extracted in step S2.
Figure 4D:
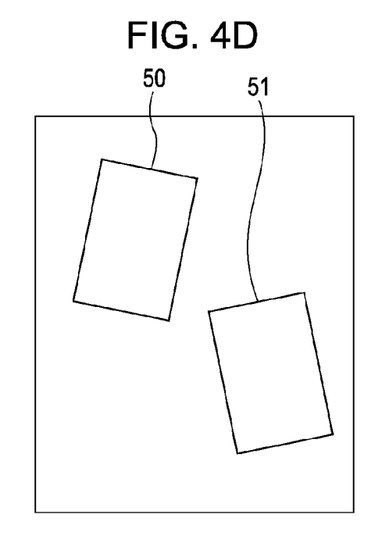

In step S2, an object, serving as or included in a document region, is extracted on the basis of the read image. A process for extraction will be described later. FIGS. 4C and 4D are diagrams illustrating objects extracted in step S2. Objects 40 and 41 are obtained by extracting the photos included in the magazine document. Objects 42 and 43 are obtained by extracting text portions. Objects 44, 45, and 46 are obtained by extracting edges of the magazine document. Objects 50 and 51 are obtained by extracting the photos as documents.

Figure 4E:
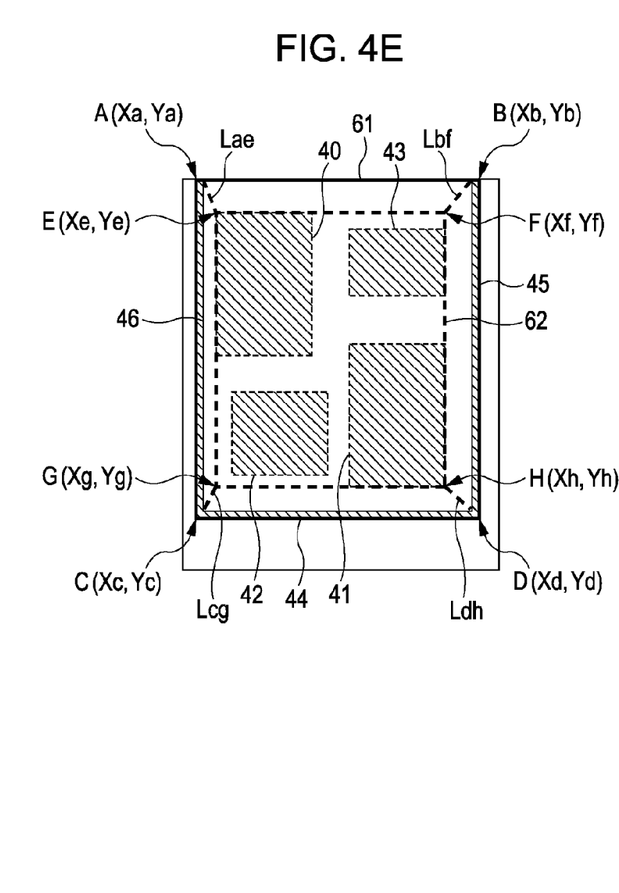
FIGS. 4E and 4F are diagrams each illustrating a first rectangle obtained in step S3, the first rectangle including all of the objects.
Figure 4F:
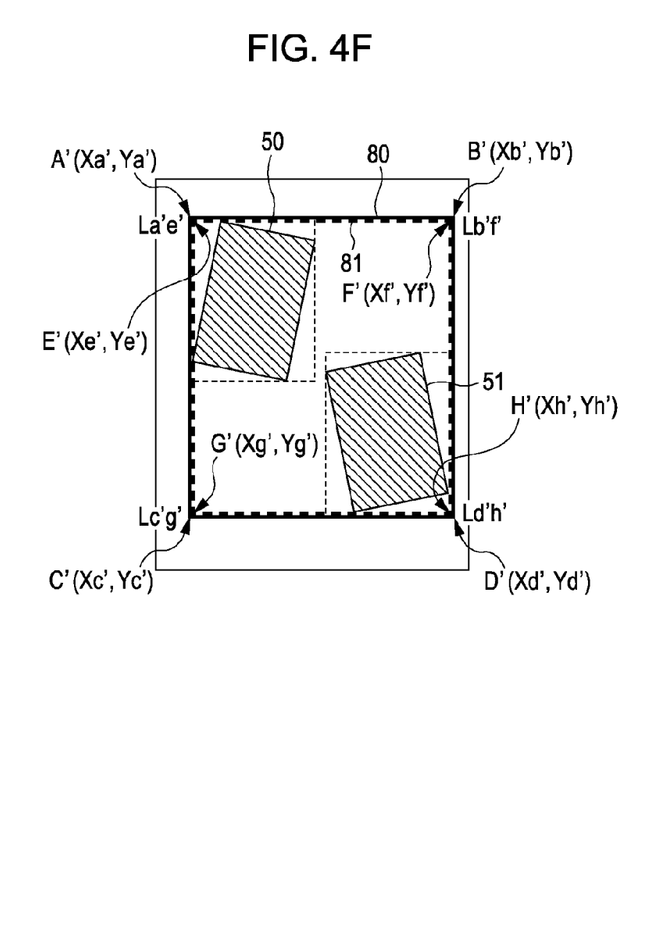

In step S3, a first rectangle including all of the objects is calculated. FIGS. 4E and 4F are diagrams illustrating first rectangles calculated in step S3, each first rectangle including all of the objects, each side of the rectangle being parallel to the corresponding side of a reading region of the document plate. In the following description, each side of a rectangle calculated from an image including an object is parallel to the corresponding side of the reading region of the document plate. A rectangle 61 includes all of the objects 40 to 46 extracted from the one magazine document. Similarly, a rectangle 80 includes all of the objects 50 and 51 extracted from the photo documents.

In step S4, the coordinates of each vertex of the rectangle calculated in step S3 are obtained. In this instance, let A(Xa, Ya), B(Xb, Yb), C(Xc, Yc), and D(Xd, Yd) denote the respective coordinates of the four vertices of the rectangle 61 and let A'(Xa', Ya'), B'(Xb', Yb'), C'(Xc', Yc'), and D'(Xd', Yd') denote those of the four vertices of the rectangle 80.

In step S5, identification is made on each of the objects as to whether the object is a document item. A document item is a piece of information content of the document such as text, graphics or photo. A process for identification will be described later. In step S6, a second rectangle which includes all of the objects identified as document items, whose sides are parallel to the corresponding sides of the reading region of the image reader R1, and which has a minimum area is calculated. The long-side to short-side ratio of each of the objects 44, 45, and 46 is greater than a threshold value T. It is identified in step S5 that the objects 44, 45, and 46 are not document items. Accordingly, the rectangle which includes all of the objects 40, 41, 42, and 43 identified as document items and which has a minimum area is a rectangle 62. On the other hand, since the objects 50 and 51 are identified as document items in step S6, the rectangle which includes all of the objects identified as document items and which has a minimum area is a rectangle 81.

In step S7, the coordinates of each vertex of the second rectangle calculated in step S6 are obtained. In this instance, let E(Xe, Ye), F(Xf, Yf), G(Xg, Yg), and H(Xh, Yh) be the respective coordinates of the four vertices of the rectangle 62 and let E'(Xe', Ye'), F'(Xf', Yf'), G'(Xg', Yg'), and H'(Xh', Yh') denote the respective coordinates of the four vertices of the rectangle 81.

In step S8, the coordinates of each vertex of the first rectangle are compared to those of the vertices of the second rectangle to obtain the level of similarity between the first and second rectangles. A process for comparison will be described in detail later. In step S9, a method of cropping a document region is determined on the basis of the level of similarity in vertex coordinates between the first and second rectangles obtained in step S8.

If the image is read at the low resolution for prescanning in step S1, at least one document region determined in step S9 is read at the resolution for scanning to obtain an image and the image is subjected to various image processes such as tilt correction and tone correction. On the other hand, if the image is read at the resolution for scanning in step S1, at least one document region determined in step S9 is cropped on the basis of image data stored in a memory and the image in the cropped document region is subjected to the various image processes such as tile correction and tone correction. When it is determined in step S9 that the read image corresponds to one document, tile correction may be omitted.

An image, serving as or included in a document region determined in the above-described manner, is extracted, so that image data corresponding to a document can be obtained.

Figure 5:
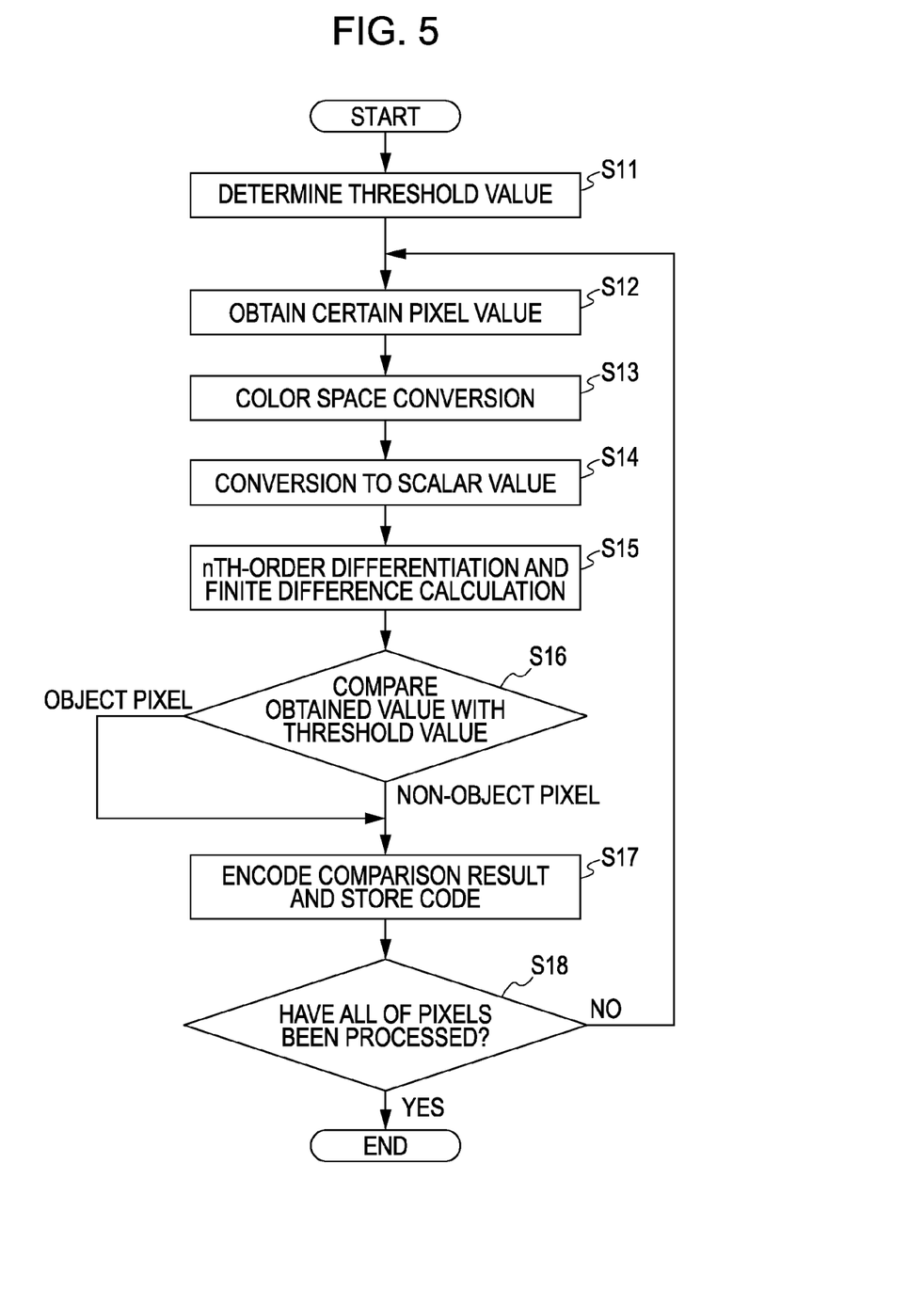
FIG. 5 is a flowchart illustrating a process (step S2) for extracting objects.

FIG. 5 is a flowchart of the process (step S2) for extracting an object.

In step S11, a threshold value for binarization is determined on the basis of an image. The threshold value is changed to an optimum value depending on the process for comparison in step S16 which will be described later. To easily determine the threshold value, a fixed value may be previously determined.

In step S12, the value of a certain pixel is obtained. To process all of pixels in order to extract an object from the image, processing steps S12 to S17 are sequentially performed on each pixel, so that all of the pixels can be processed. In general, the position of a certain pixel is specified using the X coordinate and the Y coordinate of the pixel. Upon starting the process, each of the X coordinate and the Y coordinate is initialized to an initial value (typically, 0). The X coordinate and the Y coordinate are changed each time one pixel is processed, so that all of the pixels are scanned.

In step S13, the color space of the pixel value obtained in step S12 is converted. In general, the color space of the image reader R1 varies depending on the characteristics of the CCD 3 including the linear sensors, a color filter, and the light source lamp 11. When a device-independent color space is used, an object can be extracted independent of the image reader R1. Accordingly, the color space is converted in step S13. When parameters depending on the image reader R1 are adjusted and the threshold value is then determined in step S11, step S13 can be omitted.

In step S14, the value obtained in step S13 is converted to a scalar value. In a case where a color image is input, the image has values of three colors of RGB (hereinafter, "RGB values"). To compare the RGB values (vectors) with the threshold value (scalar value), the RGB values are converted to a scalar value. As for a method for conversion, a method of extracting a value of any of the three colors, a method of calculating the mean value of appropriately weighted RGB values to obtain a brightness value, or a method of calculating a saturation from the RGB values may be used. When an input image is a single-color image, or a grayscale image, the processing step is not needed. Step S14 can be omitted.

In step S15, nth-order differentiation and finite difference calculation are performed on the basis of the value obtained in step S14. As for the process for extracting an object from an image, when the boundary between a document placed on the document plate and other matter is extracted, a document region can be easily determined with high accuracy. In order to extract the boundary therebetween, nth-order differentiation and finite difference calculation are performed. This calculation processing depends on the characteristics of the value obtained in step S14. If the calculation processing is not needed, step S15 can be omitted.

In step S16, the value obtained in step S15 is compared to the threshold value determined in step S11. When the obtained value is less than the threshold value, it is determined that the pixel is not included in an object, namely, the pixel constitutes a non-object (hereinafter, "non-object pixel"). Whereas, when the obtained value is equal to or greater than the threshold value, the pixel constitutes an object (hereinafter, "object pixel"). The relationship may be inverted in accordance with a value obtained in steps S13 to S15. In other words, when the obtained value is less than the threshold value, it is determined that the pixel is an object pixel. Whereas, when the obtained value is equal to or greater than the threshold value, it is determined that the pixel is a non-object pixel. The relationship is previously determined. When the document plate is read, an obtained image is white because the white sheet 22 has been read. Accordingly, a portion excluding a document on the document plate is also white in an obtained image. In addition, the base color of a typical document, e.g., a magazine document is often white. Therefore, assuming that determination is performed based on brightness, when the obtained value is less than the threshold value, it is determined that the pixel is an object pixel. Assuming that determination is performed based on saturation, when the obtained value is equal to or greater than the threshold value, it is determined that the pixel is an object pixel.

In step S17, the result of comparison in step S16 is stored. The comparison result is any of two kinds, i.e., an object pixel and a non-object pixel. Accordingly, the comparison result is encoded as "0: object pixel" or "1: non-object pixel" and the code is stored.

In step S18, determination is made as to whether all of the pixels have been processed in step S17. If all of the pixels have been processed, the process terminates.

Although the processing steps are sequentially performed in the order described in the flowchart of FIG. 5 in the first embodiment, the result in step S15 may be necessary to determine the threshold value in step S11, alternatively, conversion of the value of an adjacent pixel to a scalar value (S14) may be needed for nth-order differentiation and finite difference calculation (S15). Therefore, the order of the processing steps in the flowchart can be changed as necessary. In addition, although the process illustrated in the flowchart of FIG. 5 is used only once in the first embodiment, the process may be performed a plurality of times. At that time, a method of processing in each step may be changed. For example, in the first-time process, color space conversion is omitted, a brightness is obtained, and second-order differentiation is used. In the second-time process, color space conversion is performed, saturation is obtained, and step S15 is skipped. After that, the results of the processes are combined such that the AND or OR of the two results is obtained. Using the AND or OR is appropriately determined because the use depends on encoding in step S17.

Figure 6:
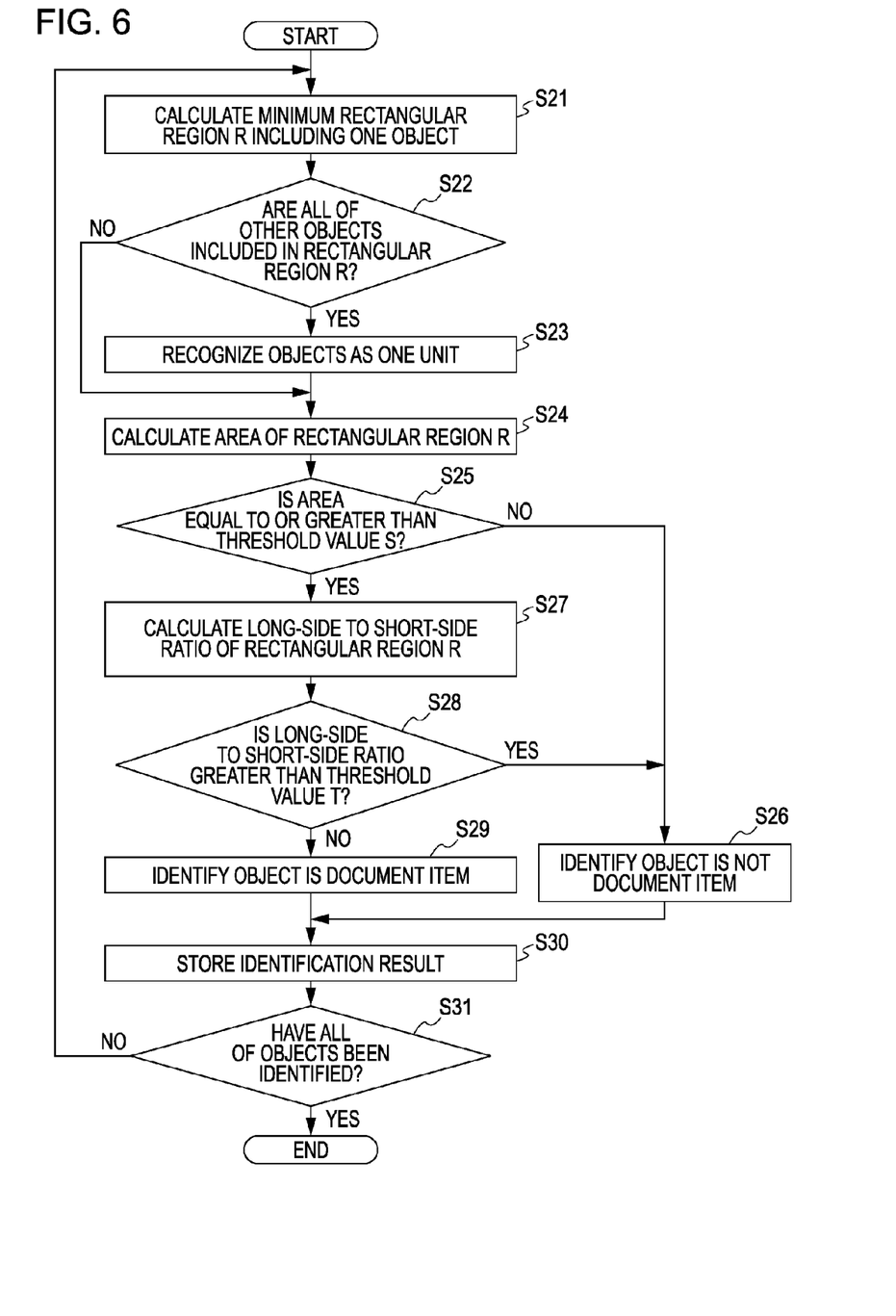
FIG. 6 is a flowchart illustrating a process (step S5) for determining whether an object is a document item.

FIG. 6 is a flowchart illustrating the process (step S5) for identifying whether an object is a document item. In step S21, processing of calculating a minimum rectangular region R including one object is performed on each of objects extracted in step S2. In step S22, determination is made as to whether the rectangular region R includes all of the other objects. If the rectangular region R includes all of the other objects, the objects are recognized as one object unit in step S23. The rectangular region R including the object unit is again calculated.

In step S24, the area of the rectangular region R is calculated. In step S25, the calculated area is compared to a threshold value S. In this instance, it is assumed that the threshold value S is appropriate for an object corresponding to a document item. When the area is less than the threshold value S, the object may be dust or noise. In step S26, therefore, it is identified that the object is not a document item.

If the area is equal to or greater than the threshold value S, the long-side to short-side ratio of the rectangular region R is calculated in step S27. In step S28, the calculated long-side to short-side ratio is compared to a threshold value T. In this instance, it is assumed that the threshold value T is appropriate to an object corresponding to a document item. When the long-side to short-side ratio is greater than the threshold value T, the object may be dust or noise because the object is an extremely long rectangle. It is therefore identified in step S26 that the object is not a document item. When it is determined in step S28 that the ratio is equal to or less than the threshold value T, it is identified in step S29 that the object is a document item. In step S30, the result of identification on the object is stored. In step S31, determination is made as to whether all of the objects have been identified.

Figure 7:
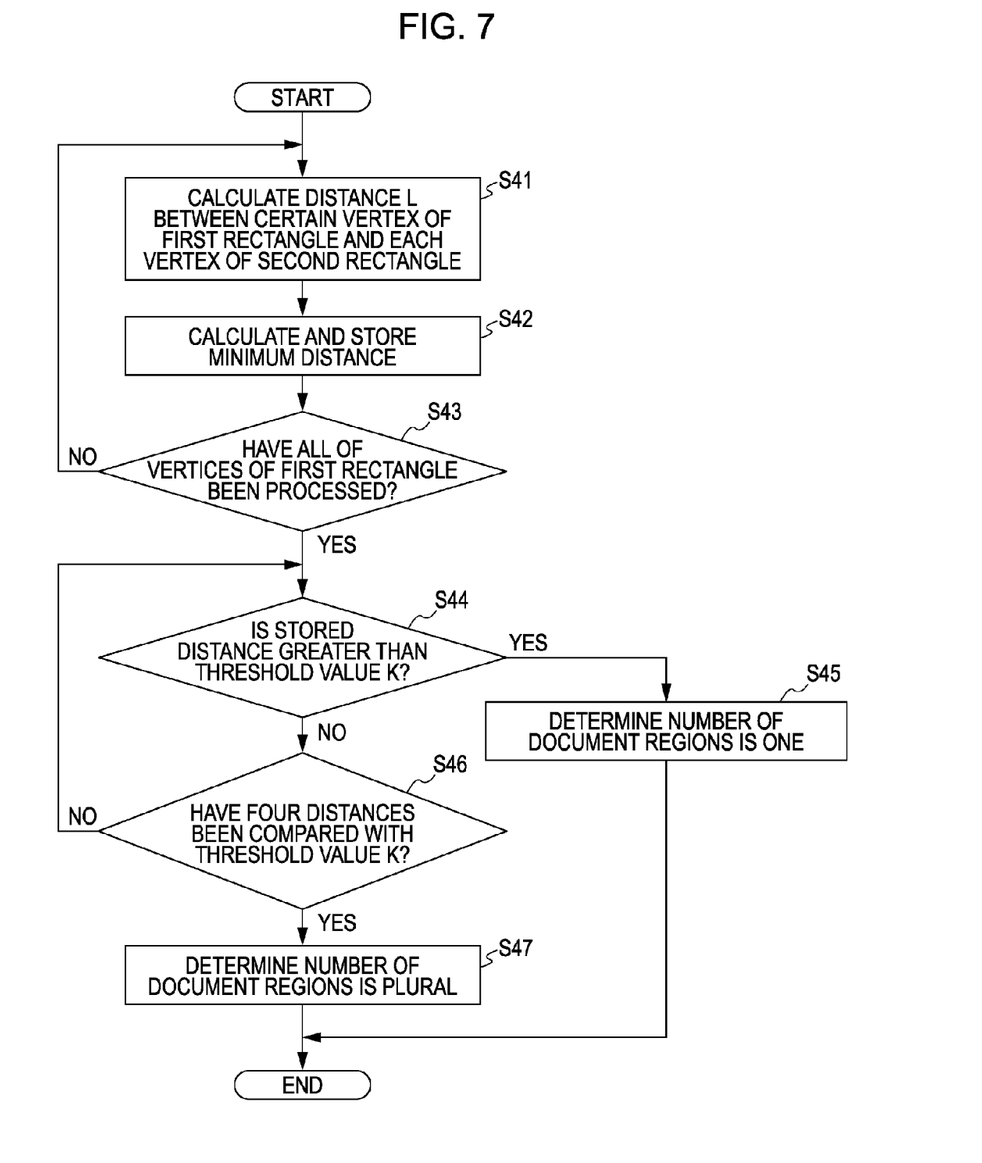
FIG. 7 is a flowchart illustrating a process (step S7) for obtaining the level of similarity in vertex coordinates between the first rectangle and a second rectangle.

FIG. 7 is a flowchart illustrating the process (step S8) for obtaining the level of similarity in vertex coordinates between the first rectangle and the second rectangle. In step S41, a distance L between one vertex of the first rectangle and each of the vertices of the second rectangle is calculated. When let distances between the vertex A of the rectangle 61 and the vertices E, F, G, and H of the rectangle 62 in FIG. 4E be Lae, Laf, Lag, and Lah, the distances Lae, Laf, Lag, and Lah are obtained by the following equations.

$$Lae=\sqrt{(Xa-Xe)^2+(Ya-Ye)^2}$$

$$Laf=\sqrt{(Xa-Xf)^2+(Ya-Yf)^2}$$

$$Lag=\sqrt{(Xa-Xg)^2+(Ya-Yg)^2}$$

$$Lah=\sqrt{(Xa-Xh)^2+(Ya-Yh)^2}$$

In step S42, the minimum distance is calculated. The minimum distance L is obtained by the following equation.

$$La\_min=min(Lae, Laf, Lag, Lah)$$

The distance La_min is the minimum distance between the vertex A and the vertex of the second rectangle. Similarly, in step S43, a minimum distance between each of the vertices B, C, and D of the first rectangle and any of the vertices of the second rectangle is calculated. The minimum distances in FIG. 4E are as follows.

$$La\_min=min(Lae, Laf, Lag, Lah)=Lae$$

$$Lb\_min=min(Lbe, Lbf, Lbg, Lbh)=Lbf$$

$$Lc\_min=min(Lce, Lcf, Lcg, Lch)=Lcg$$

$$Ld\_min=min(Lde, Ldf, Ldg, Ldh)=Ldh$$

Minimum distances regarding the rectangles 80 and 81 in FIG. 4F are obtained in a manner similar to the above.

$$La'\_min=min(La'e', La'f', La'g', La'h')=La'e'$$

$$Lb'\_min=min(Lb'e', Lb'f', Lb'g', Lb'h')=Lb'f'$$

$$Lc'\_min=min(Lc'e', Lc'f', Lc'g', Lc'h')=Lc'h'$$

$$Ld'\_min=min(Le'e', Ld'f', Ld'g', Ld'h')=Ld'g'$$

In step S44, each of the distances Lmin is compared to a threshold value K. As will be understood with reference to FIG. 4F, when a plurality of documents are placed, the size of the first rectangle 80 is substantially the same as that of the second rectangle 81. Accordingly, each distance Lmin is equal to or less than a predetermined value. When one document is placed, the size of the first rectangle 61 differs from that of the second rectangle 62. Accordingly, each distance Lmin is greater than the predetermined value. Therefore, when the distance Lmin is greater than the threshold value K, it is determined in step S45 that the number of document regions is one and the document region corresponds to the first rectangle. In step S46, each of the four distances Lae, Lbf, Lcg, and Ldh is compared to the threshold value K and each of the four distances La'e', Lb'f', Lc'g', and Ld'h' is also compared to the threshold value K. In this case, if each of the four distances is equal to or less than the threshold value K, it is determined in step S47 that the number of document regions is plural and the document regions correspond to the objects as document items included in the second rectangle.

Second Embodiment

The position where a document is placed on a document plate varies from image reader to image reader. When the position where a document is to be placed is previously known, the number of documents is one, and a user is instructed to set the document in the predetermined position, the coordinates of one vertex of the first rectangle are compared with those of the corresponding vertex of the second rectangle in step S8, so that a document region can be determined.

Figure 8A:
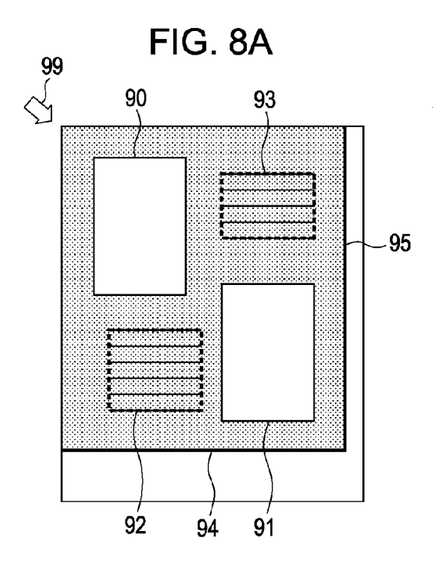
FIGS. 8A and 8B illustrate objects extracted in step S2 in a second embodiment of the present invention, the objects in FIG. 8A being extracted from an image obtained by reading one magazine document, the objects in FIG. 8B being extracted from an image obtained by reading a plurality of photo documents.
Figure 8B:
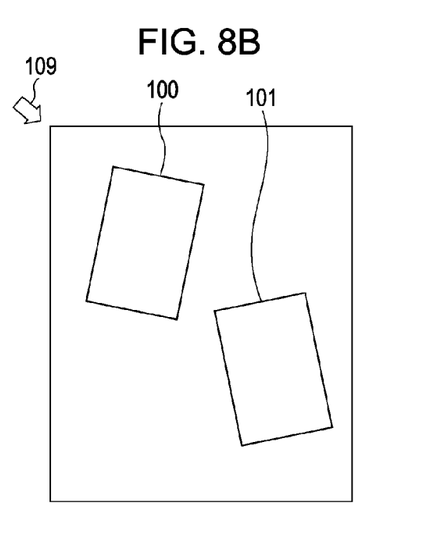

FIGS. 8A and 8B are diagrams illustrating objects extracted in step S2. The objects in FIG. 8A are extracted from an image obtained by reading one magazine document which is placed on the document plate of the image reader R1 and includes photos and text. The objects in FIG. 8B are extracted from an image obtained by reading a plurality of photo documents. FIGS. 8A and 8B differ from FIGS. 4A and 4B in that the document is aligned with an alignment position 99 on the document plate and the documents are placed relative to an alignment position 109 on the document plate. The extracted objects, indicated at 90 and 91, correspond to the photos in the magazine document. The extracted objects, indicated at 92 and 93, correspond to text portions. The extracted objects, indicated at 94 and 95, correspond to edges of the magazine document. The extracted objects, indicated at 100 and 101, correspond to the photo documents.

Figure 8C:
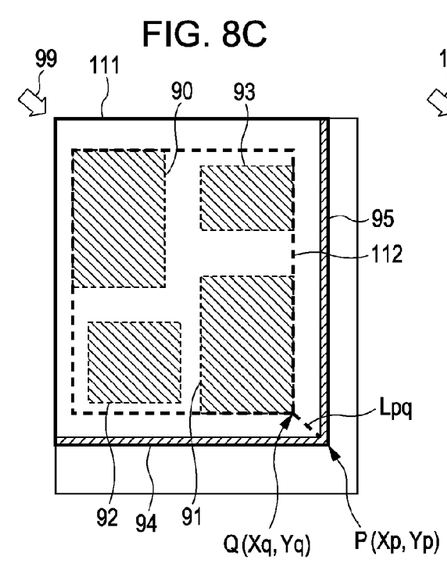
FIGS. 8C and 8D illustrate rectangular regions including the extracted objects in FIGS. 8A and 8B, respectively.
Figure 8D:
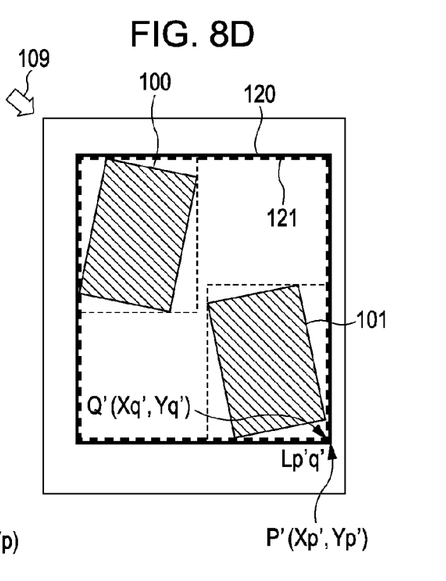

FIGS. 8C and 8D are diagrams each illustrating a rectangular region including the extracted objects in the second embodiment.

A rectangle 111 in FIG. 8C is a first rectangle, obtained in step S3, including all of the objects. Similarly, a rectangle 120 in FIG. 8D is a first rectangle including the objects 100 and 101. A rectangle 112 is a second rectangle, obtained in steps S5 and S6, including all of the objects 90, 91, 92, and 93 identified as document items and having a minimum area. Similarly, a rectangle 121 is a second rectangle including the objects 100 and 101 identified as document items and having a minimum area. When the number of documents is one, the user is instructed to align the document with the alignment position 99 (109). Therefore, the coordinates of the vertex of the first rectangle diagonally opposite to the alignment position are compared to those of the corresponding vertex of the second rectangle. Consequently, a document region can be obtained. Referring to FIG. 8C, the vertex P(Xp, Yp) of the first rectangle 111 is diagonally opposite to the alignment position 99 and the vertex Q(Xq, Yq) of the second rectangle 112 is diagonally opposite to the alignment position 99. The distance between the vertices P and Q is obtained by the following equation.

$$Lpq=\sqrt{(Xp-Xq)^2+(Yp-Yq)^2}$$

Similarly, the distance between the vertex P'(Xp', Yp') of the first rectangle 120 and the vertex Q'(Xq', Yq') of the second rectangle 121 diagonally opposite to the alignment position 109 is obtained by the following equation.

$$Lp'q'=\sqrt{(Xp'-Xq')^2+(Yp'-Yq')^2}$$

In step S8, each of the distance Lpq between the vertices P and Q and the distance Lp'q' between the vertices P'Q' is compared to the threshold value K. When the distance (Lpq, Lp'q') is greater than the threshold value K, the first and second rectangles indicate different regions. Thus, it is determined that the number of document regions is one and the document region corresponds to the first rectangle. When the distance (Lpq, Lp'q') is equal to or less than the threshold value K, the first and second rectangles indicate the same region. Thus, it is determined that the number of document regions is plural and the document regions correspond to the objects as document items included in the second rectangle. The other processing steps are the same as those in the first embodiment.

A storage medium in which the program code of software for implementing the functions of the above-described embodiments is stored may be supplied to a system or an apparatus and a computer (CPU or MPU) of the system or apparatus may read out and execute the program code stored in the storage medium. Aspects of the present invention can also be achieved in this manner. In this case, the functions of the above-described embodiments are implemented by the read-out program code itself and the aspects of the present invention include the storage medium storing the program code.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. An image processing apparatus comprising:
   an obtaining unit configured to obtain image data including a plurality of objects;
   a first specifying unit configured to specify a first region corresponding to a document region from the image data obtained by the obtaining unit;
   a second specifying unit configured to specify a second region surrounding the objects included in the image data obtained by the obtaining unit;
   a determining unit configured to determine whether a size of the first region specified by the first specifying unit is larger than a size of the second region specified by the second specifying unit; and
   an extracting unit configured to extract image data including the objects if the determining unit determines that the size of the first region is larger than the size of the second region and to individually extract image data corresponding to each of the objects if the determining unit determines that the size of the first region is not larger than the size of the second region.

2. The apparatus according to claim 1, further comprising a recognizing unit configured to recognize an object from the image data obtained by the obtaining unit, wherein the second specifying unit specifies the second region surrounding the objects recognized by the recognizing unit.

3. The apparatus according to claim 2, wherein the recognizing unit recognizes the object of which a size is larger than a predetermined size.

4. The apparatus according to claim 2, wherein the recognizing unit recognizes the object of which a long-side size to short-side size ratio is smaller than a predetermined ratio.

5. The apparatus according to claim 1, wherein the second specifying unit specifies a minimum area of the image data including the objects as the second region.

6. The apparatus according to claim 1, wherein the first specifying unit specifies a first rectangular region as the first region, the second specifying unit specifies a second rectangular region as the second region, and the determining unit determines whether a size of the first rectangular region is larger than a size of the second rectangular region by comparing a coordinate of a vertex of the first rectangular region with a coordinate of a vertex of the second rectangular region.

7. The apparatus according to claim 1, wherein the extracting unit extracts the image data including the objects as one document if the determining unit determines that the size of the first region is larger than the size of the second region.

8. The apparatus according to claim 1, wherein the extracting unit individually extracts the image data corresponding to each of the objects as plural documents if the determining unit determines that the size of the first region is not larger than the size of the second region.

9. The apparatus according to claim 1, wherein the obtaining unit obtains the image data generated by reading at least one document set to an image reading apparatus.

10. An image processing method comprising:
    obtaining image data including a plurality of objects;
    specifying a first region corresponding to a document region from the obtained image data;
    specifying a second region surrounding the objects included in the obtained image data;
    determining whether a size of the first region is larger than a size of the second region;
    extracting image data including the objects if it is determined that the size of the first region is larger than the size of the second region; and
    individually extracting image data corresponding to each of the objects if it is determined that the size of the first region is not larger than the size of the second region.

11. A non-transitory computer-readable storage medium storing a computer-executable program for executing the image processing method of claim 10.

* * * * *